United States Patent

Voigt

[11] Patent Number: 5,673,544
[45] Date of Patent: Oct. 7, 1997

[54] DIPOSABLE LAWN MOWER DEBRIS BAG SYSTEM

[76] Inventor: Bernard Voigt, 15 High St., Hicksville, N.Y. 11801

[21] Appl. No.: 555,974

[22] Filed: Nov. 13, 1995

[51] Int. Cl.$^6$ ............................................. A01D 34/70
[52] U.S. Cl. ........................ 56/202; 56/199; 56/320.2
[58] Field of Search ........................... 56/202, 199, 203, 56/320.2, 194, 198; 224/42.45 R, 42.42

[56] References Cited

U.S. PATENT DOCUMENTS

| | | | |
|---|---|---|---|
| 3,387,346 | 6/1968 | Hasenbank | 56/202 |
| 3,393,500 | 7/1968 | Macleod et al. | 56/202 |
| 3,492,800 | 2/1970 | Peterson et al. | 56/202 |
| 3,574,272 | 4/1971 | Krewson | 56/202 |
| 3,791,118 | 2/1974 | Behrens | 56/202 |
| 3,802,173 | 4/1974 | Opitz | 56/202 |
| 3,874,152 | 4/1975 | Dahl | 56/202 |
| 3,890,772 | 6/1975 | Seifert et al. | 56/202 |
| 3,934,392 | 1/1976 | Moery et al. | 56/202 |
| 3,995,414 | 12/1976 | Kerr et al. | 56/202 |
| 4,030,273 | 6/1977 | Leader | 56/202 X |
| 4,186,546 | 2/1980 | Machado et al. | 56/202 |
| 4,233,806 | 11/1980 | Richardson | 56/202 |
| 4,244,160 | 1/1981 | Carolan | 56/202 X |
| 4,251,982 | 2/1981 | Skaja et al. | 56/202 |
| 4,377,063 | 3/1983 | Leaphart | 56/202 |
| 4,505,095 | 3/1985 | Short, Sr. | 56/202 |
| 4,598,536 | 7/1986 | Langley | 56/202 |
| 4,637,202 | 1/1987 | Lamusga | 56/202 X |
| 4,723,398 | 2/1988 | Flenniken et al. | 56/202 X |
| 4,747,259 | 5/1988 | Kline et al. | 56/202 |
| 4,907,403 | 3/1990 | Jones | 56/202 |
| 4,989,400 | 2/1991 | Wark | 56/202 |
| 5,003,758 | 4/1991 | Bernstein | 56/202 |
| 5,042,241 | 8/1991 | Boylston et al. | 56/202 |
| 5,125,222 | 6/1992 | Speier | 56/202 |
| 5,179,824 | 1/1993 | Ridge et al. | 56/202 |
| 5,366,727 | 11/1994 | Cross | 56/202 X |

Primary Examiner—Terry Lee Melius
Assistant Examiner—Victor Batson
Attorney, Agent, or Firm—Michael I. Kroll

[57] ABSTRACT

A disposable lawn mower debris bag system (12) comprising a plurality of disposable debris collection bags (14). A facility (16) is for attaching each bag (14) one at a time to a discharge chute (18) on a power lawn mower (20). When the bag (14) is filled with debris, the attaching facility (16) can be detached and the bag (14) removed from the discharge chute (18) to be properly disposed of.

1 Claim, 3 Drawing Sheets

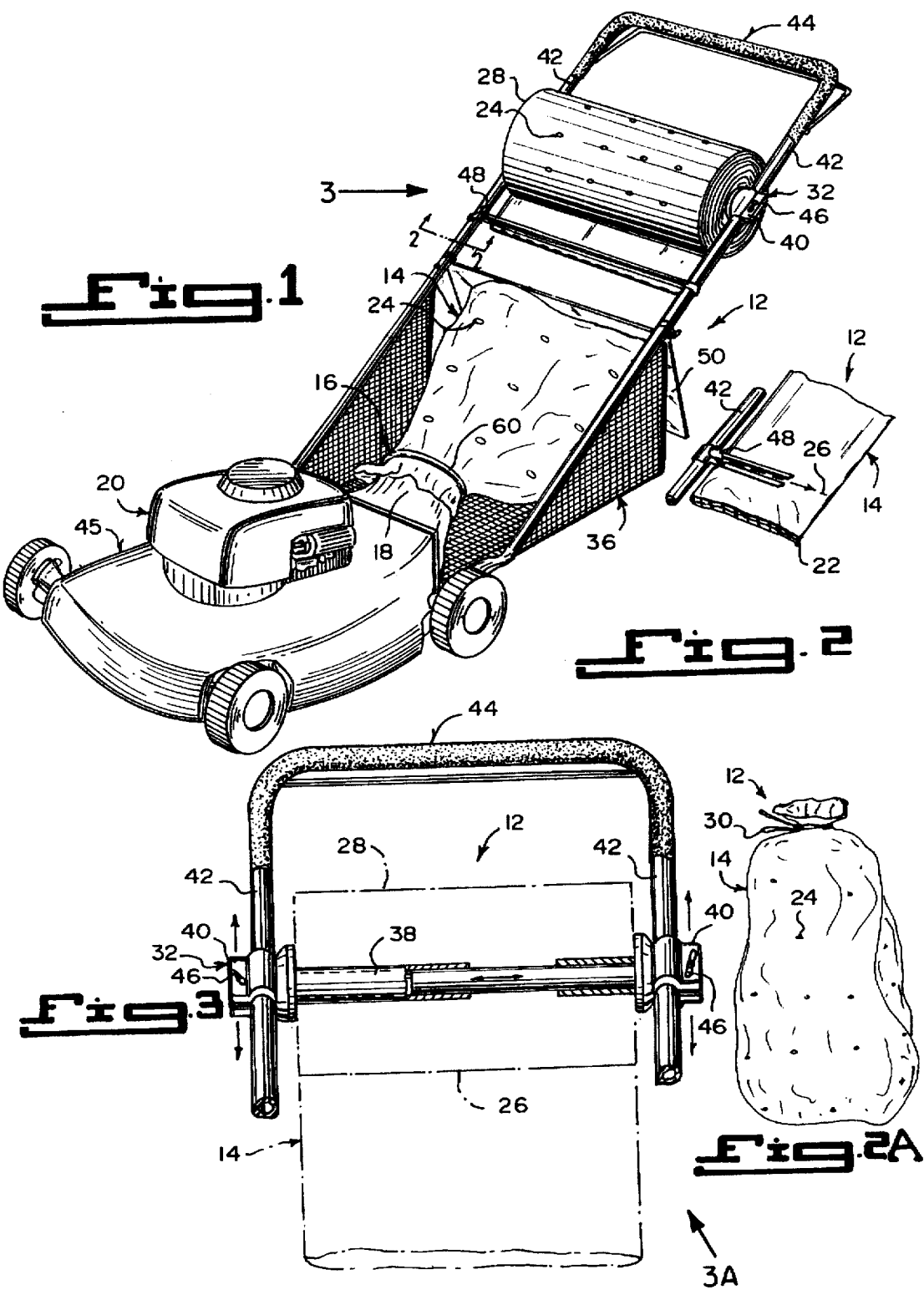

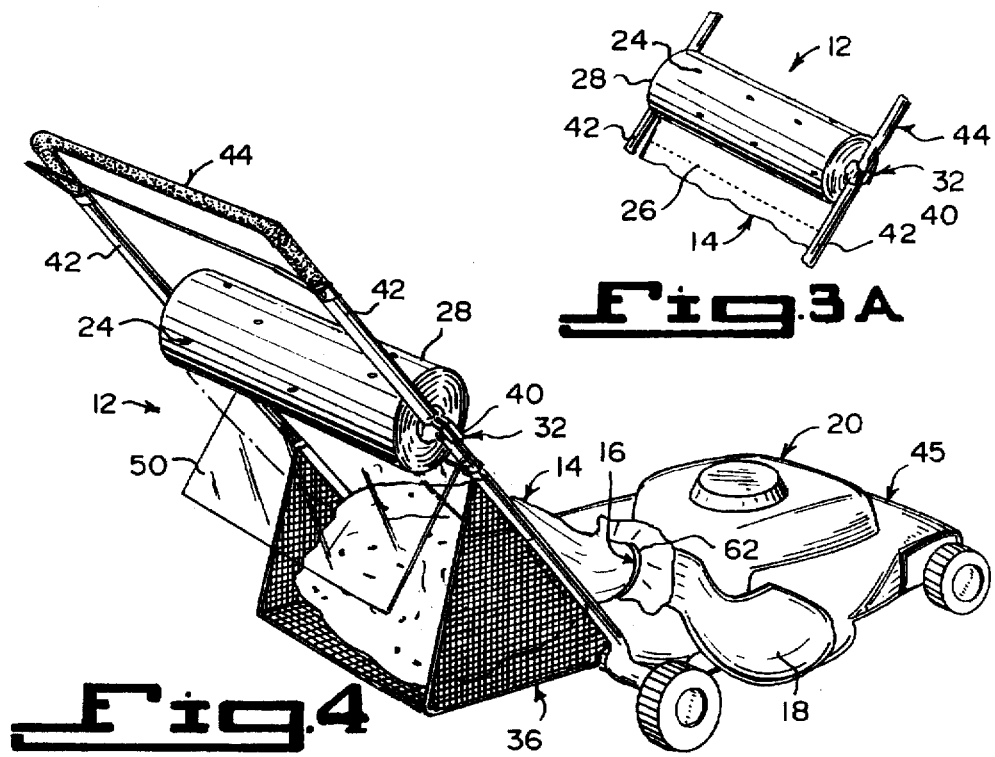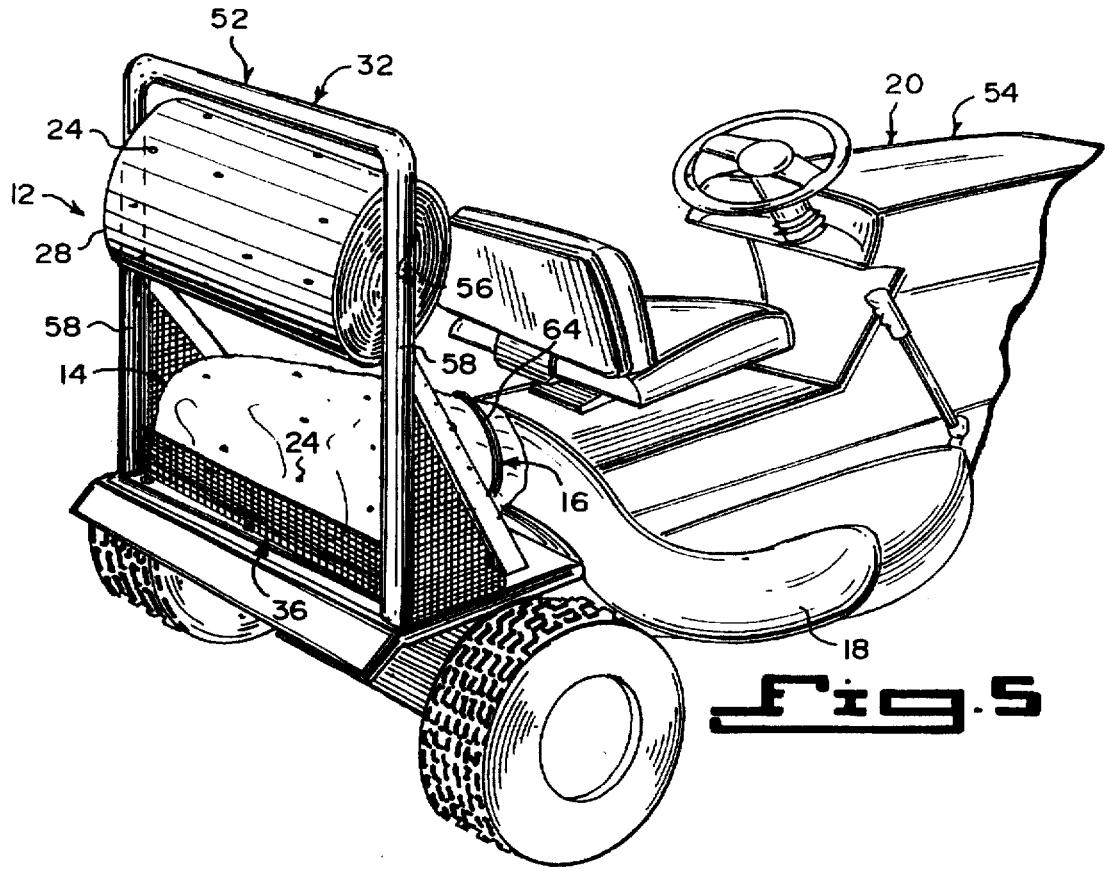

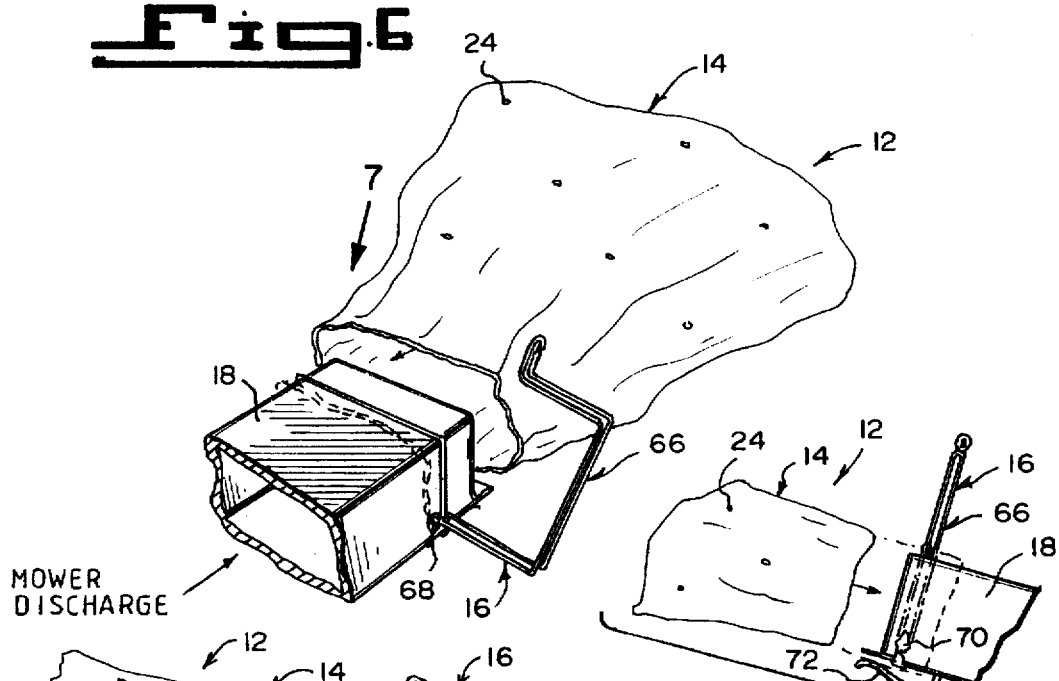

DIPOSABLE LAWN MOWER DEBRIS BAG SYSTEM

BACKGROUND OF THE INVENTION

1. Field of the Invention

The instant invention relates generally to lawn mower equipment and more specifically it relates to a disposable lawn mower debris bag system.

2. Description of the Prior Art

Numerous lawn mower equipment have been provided in prior art that are adapted to be used in conjunction with various types of power lawn mowers, so that people can simply cut the grass on their lawns. While these units may be suitable for the particular purpose to which they address, they would not be as suitable for the purposes of the present invention as heretofore described.

SUMMARY OF THE INVENTION

A primary object of the present invention is to provide a disposable lawn mower debris bag system that will overcome the shortcomings of the prior art devices.

Another object is to provide a disposable lawn mower debris bag system, that utilizes a plurality of disposable debris collection bags, in which each bag can be quickly attached one at a time to the discharge chute of different types of power lawn mowers, and when filled detached and secured with a twist tie for disposal.

An additional object is to provide a disposable lawn mower debris bag system, in which the disposable debris collection bags are rolled up and separated by perforation lines on a dispenser mounted on the power lawn mower adjacent the discharge chute, so that the bags can be conveniently dispensed from the dispenser and attached to the discharge chute for use.

A further object is to provide a disposable lawn mower debris bag system that is simple and easy to use.

A still further object is to provide a disposable lawn mower debris bag system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a front perspective view of a gas powered lawn mower with the instant invention installed thereto.

FIG. 2 is a cross sectional perspective view taken along line 2—2 in FIG. 1, showing a portion of the slide member in greater detail.

FIG. 2A is a perspective view of a filled disposable debris collection bag closed with a twist tie for disposal.

FIG. 3 is a perspective view taken in the direction of arrow 3 in FIG. 1, with parts in phantom broken away and in section, showing the dispenser in greater detail.

FIG. 3A is a perspective view taken in the direction of arrow 3A in FIG. 3, with additional parts broken away and showing the perforation line in greater detail.

FIG. 4 is a rear perspective view of an electric power lawn mower with the instant invention installed thereto.

FIG. 5 is a rear perspective view of a rider tractor lawn mower with parts broken away and a modification of the instant invention installed thereto.

FIG. 6 is a front perspective view of a portion of a discharge chute of a power lawn mower with a clamp attachment member in an open position and a disposable debris collection bag ready to be installed thereto.

FIG. 7 is a rear perspective view taken in the direction of arrow 7 in FIG. 6.

FIG. 8 is a side view taken in the direction of arrow 8 in FIG. 7.

FIG. 9 is a side view with parts broken away and in section similar to FIG. 8, with the disposable debris collection bag installed thereto and the clamp attachment member in a closed position.

FIG. 10 is a cross sectional perspective view taken along line 10—10 in FIG. 9, with the disposable debris collection bag removed and not shown.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the severa views, FIGS. 1 through 10 illustrate a disposable lawn mower debris bag system 12, comprising a plurality of disposable debris bags 14. A facility 16 is for attaching each bag 14 one at a time to a discharge chute 118 on a power lawn mower 20. When the bag 14 is filled with debris, the attaching facility 16 can be detached and the bag 14 removed from the discharge chute 18 to be properly disposed of.

Each disposable debris collection bag 14 is fabricated out of a thin flexible plastic material 22, paper material, or a combination of plastic and paper material, having a plurality of small holes 24 to vent air produced by the operation of the power lawn mower 20, while retaining the debris deposited therein. The disposable debris collection bags 14 are made in one elongated sheet, separable by perforation lines 26 and then rolled up into one roll 28. The disposable lawn mower debris bag system 12 further contains a plurality of twist ties 30. Each twist tie 30 is used to seal each disposable debris collection bag 14 when full, to prevent the debris within the bag 14 from accidentally falling out when the bag 14 is removed from the discharge chute 18 (see FIG. 2A).

A structure 32 is for dispensing the plurality of disposable debris collection bags 14 one at a time from the roll 28, so that each bag 14 can be quickly applied when needed to the discharge chute 18 of the power lawn mower 20 by the attaching facility 16. The dispensing structure 32 includes a holder 34, for the roll 28 of the disposable debris collection bags 14 mounted upon a rear portion of the power lawn mower 20 adjacent the discharge chute 18. A netting type support frame 36, shown in FIGS. 1, 4 and 5 is affixed to the rear portion of the power lawn mower 20 under the disposable debris collection bag 14 that is connected to the discharge chute 18, so as to elevate the bag 14 above the ground.

The holder 34, as shown in FIGS. 1, 3, 3A and 4, consists of a longitudinal adjustment shaft 38. A pair of collar grips 40 are provided. Each collar grip 40 is attached to one end of the shaft 38. The collar grips 40 can fit onto opposite side portions 42 of a handle 44 on the power lawn mower 20, which is a push operated type 45. A pair of wing type locking bolts 46 are also provided. each bolt 46 is threaded through one collar grip 40, to retain the shaft 38 in a stationary manner across the handle 44.

A slide member 48, best seen in FIG. 2, is longitudinally mounted across the side portions 42 of the handle 44 of the power lawn mower 20 below the holder 34, for separating each disposable debris collection bag 14 along the perforation line 26. The bag 14 can be conveniently removed from the roll 28 and quickly applied to the discharge chute 18 of the power lawn mower 20.

A retractable deflector plate 50 is mounted to the side portions 42 of the handle 44. The deflector plate 50 can hang down behind the disposable debris collection bag 14 on the discharge chute, to prevent dirt, grass, small stones, which might escape from the small holes 24 in the bag 14 to blow up into the face of the operator of the power lawn mower 20.

The holder 32, shown in FIG. 5, consists of an inverted U-shaped rear frame member 52 mounted onto the power lawn mower 20, which is a rider tractor operated type 54. A longitudinal shaft 56 is mounted to and extends across opposite side portions 58 of the rear frame member 52.

The attaching facility 16 can be an elastic strap 60 to fit about an open end of the disposable debris collection bag 14 on the discharge chute 18 of the power lawn mower 20 (see FIG. 1). The attaching facility 16 can be a VELCRO band 62, to fit about the open end of the disposable debris collection bag 14 on the discharge chute 18 of the power lawn mower 20 (see FIG. 4). VELCRO is a trademark for a fastener consisting of hooks and loops. The attaching facility 16 can also be a cord 64, to fit about the open end of the disposable debris collection bag 14 on the discharge chute 18 of the power lawn mower 20 (see FIG. 5).

FIGS. 6 through 10 show another type of attaching facility 16, which includes a clamp attachment assembly 66 pivotally hinged at 68 about the discharge chute 18 of the power lawn mower 20. A latch member 70 is mounted on the discharge chute 18, to keep the clamp attachment assembly 66 in a closed position over top and side portions of an open end of the disposable debris collection bag 14 on the discharge chute 18. A pair of leaf springs 72 are affixed to the underside of the discharge chute 18, to retain a bottom portion of the open end of the bag 14 to the discharge chute 18.

The power lawn mower 20, shown in FIG. 1, is a push operated type 45 and is gas powered with a rear discharge chute 18. The power lawn mower 20, shown in FIG. 4, is a push operated type 45 and is electric powered with a side discharge chute 18. The power lawn mower 20, shown in FIG. 5, is a rider tractor operated type 54 and is gas powered with a side discharge chute 18. Other types of power lawn mowers (not shown) can be adapted to utilize the disposable lawn mower debris bag system 12.

LIST OF REFERENCE NUMBERS 12 disposable lawn mower debris bag system
14 disposable debris collection bag of 12
16 attaching facility of 12
18 discharge chute on 20
20 power lawn mower
22 thin flexible plastic material of 14
24 small hole in 14
26 perforation line on 14
28 roll of 14
30 twist tie for 14
32 dispensing structure of 12
34 holder of 32
36 netting type support frame
38 longitudinal adjustment shaft of 34
40 collar grip of 34
42 side portion of 44
44 handle on 20
45 push operated type for 20
46 wing type locking bolt in 40
48 slide member on 44
50 retractable deflector plate on 44
52 inverted U-shaped rear frame member
54 rider tractor operated type for 20
56 longitudinal shaft in 58
58 side portion of 52
60 elastic strap for 16
62 VELCRO band for 16
64 cord for 16
66 clamp attachment assembly of 16
68 hinge of 66 on 18
70 latch member of 16
72 leaf spring of 16

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A disposable lawn mower debris bag system comprising:
   a) a power lawn mover having a discharge chute at the rear of said mower;
   b) a rear handle portion of said lawn mower comprising a pair of side portions extending upwardly from the rear of said mower on opposite sides of said discharge chute and terminating at the top ends in a horizontal handle connecting the top ends of said side portions;
   c) a longitudinal adjustment shaft parallel to said handle connected at opposite ends to said side portions at an intermediate position along said side portions including means for sliding said shaft along said side portions and locking said shaft at any preselected position;
   d) a roll of disposable debris collection bags in the form of a single elongated sheet mounted on said shaft divided into separate bags and having perforation lines for separating each bag from said roll, said sheet having small holes to vent air entering with the debris;
   e) means attaching the free end of said roll on said shaft to said discharge chute so that the open bag on the end of the roll receives debris from said lawn mower when in operation;

f) means for dispensing said sheet from said roll mounted on and across said side portions through which said sheet extends including a slide member for separating each disposable collection bag along a perforation line for conveniently removing a new bag from said roll and quickly applying the new bag to said discharge chute;

g) a netting type support frame affixed to the rear portion of the power lawn mower to support said disposable collection bag connected to said discharge chute after said connected collection bag is detached from said roll, said netting type support frame having a bottom under said bag attached to said discharge chute and sides extending up to said side portions, and a rear side of said support frame being open;

h) a retractable solid deflector plate attached at opposite ends of one edge to said side portions, said plate hanging down from said edge and covering the rear opening of said netting type support frame behind the disposable bag supported thereon for preventing dirt, grass, small stones which might escape from said small holes in the bag to blow up into the face of the operator of the lawn mower; and i) said free end attaching means including a clamp attachment assembly pivotally hinged about the discharge chute of the lawn mower, a latch member mounted on the discharge chute to keep said clamp attachment assembly in a closed position over top and side portions of an open end of said collection bag on the discharge chute, and a pair of leaf springs affixed to the underside of the discharge chute to retain by friction a bottom portion of the open end of the bag attached to the discharge chute.

* * * * *